6 Sheets--Sheet 3.

O. C. BURDICT.
Machine for Forging Wrench-Bar Heads.

No. 168,135. Patented Sept. 28, 1875.

Witnesses
H. L. Bennew
W. H. Isaacs

Inventor:
O. C. Burdict
by his atty
E. T. Renwick

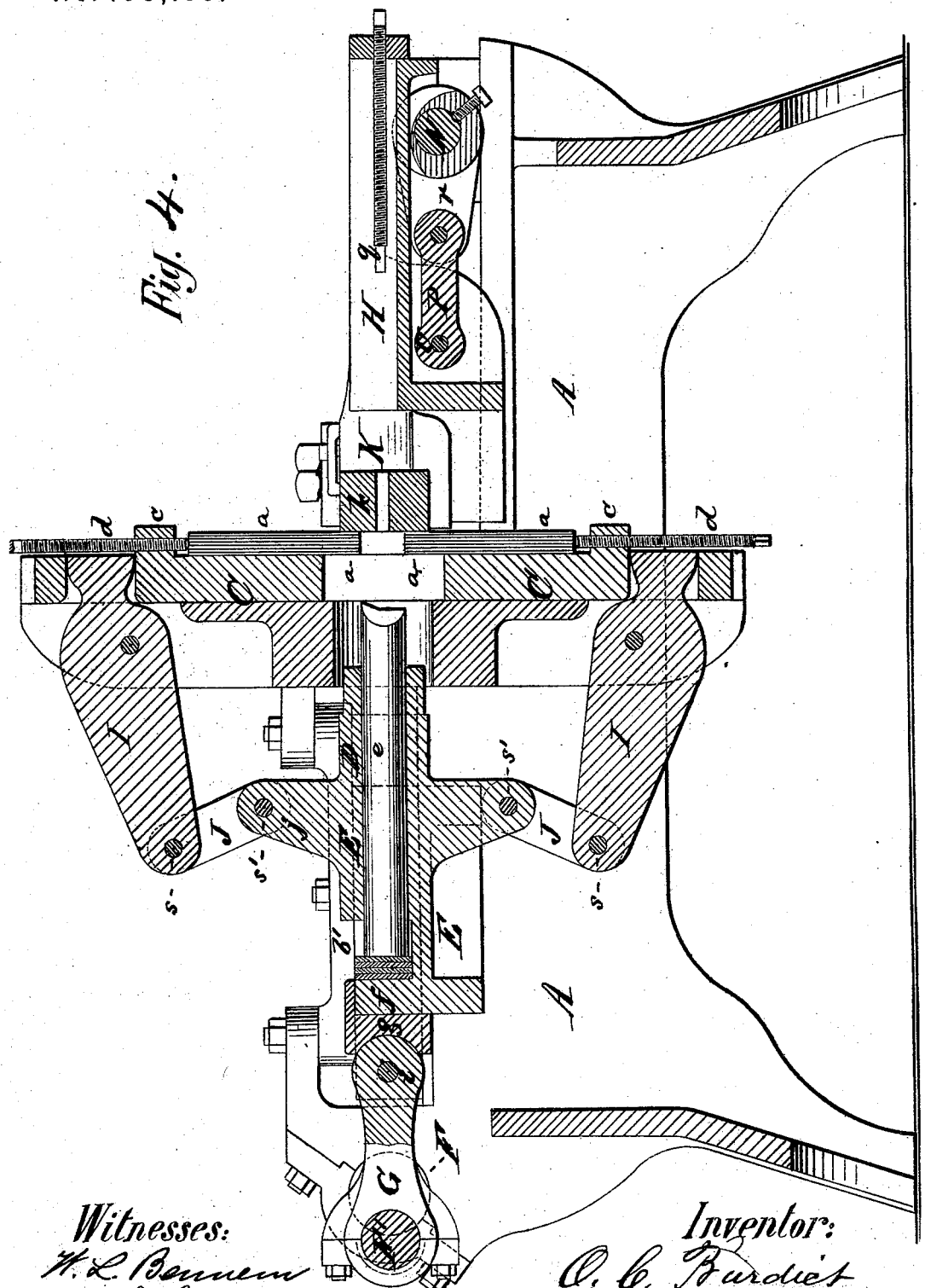

6 Sheets--Sheet 5.
O. C. BURDICT.
Machine for Forging Wrench-Bar Heads.
No. 168,135. Patented Sept. 28, 1875.
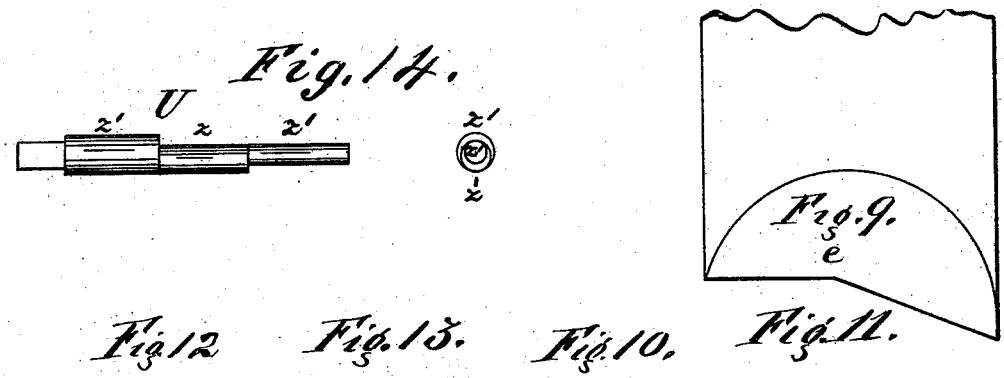
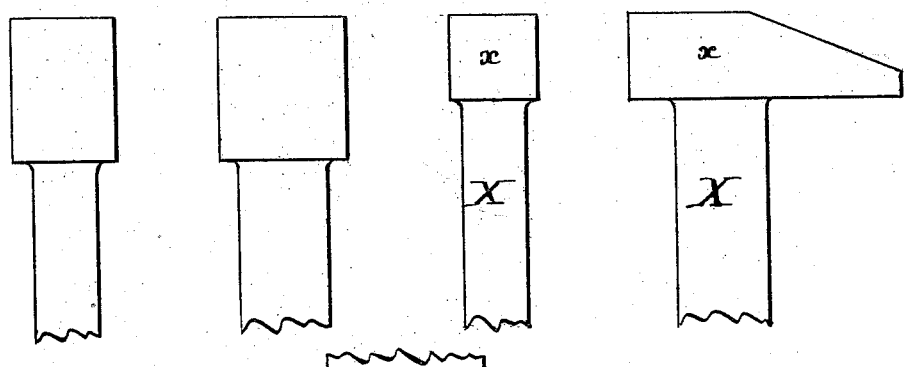
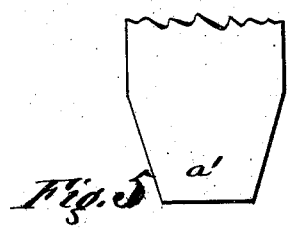
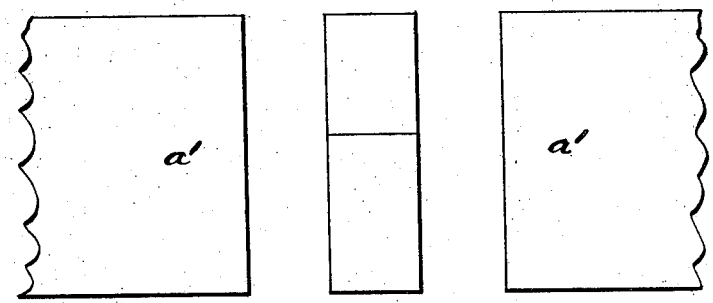
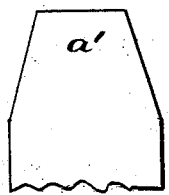
Witnesses
H. L. Bennem
W. H. Isaacs
Inventor
O. C. Burdict
by his atty
E. S. Renwick O. C. BURDICT.
Machine for Forging Wrench-Bar Heads.
No. 168,135. Patented Sept. 28, 1875.
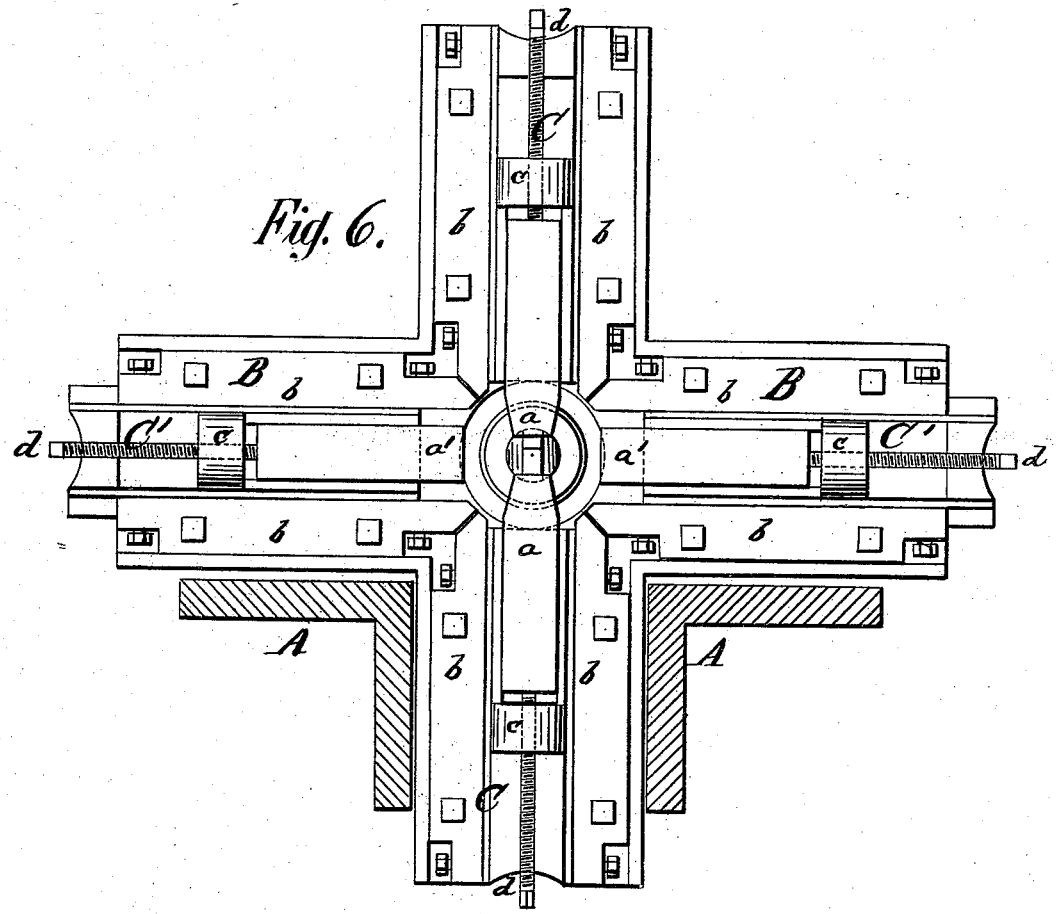
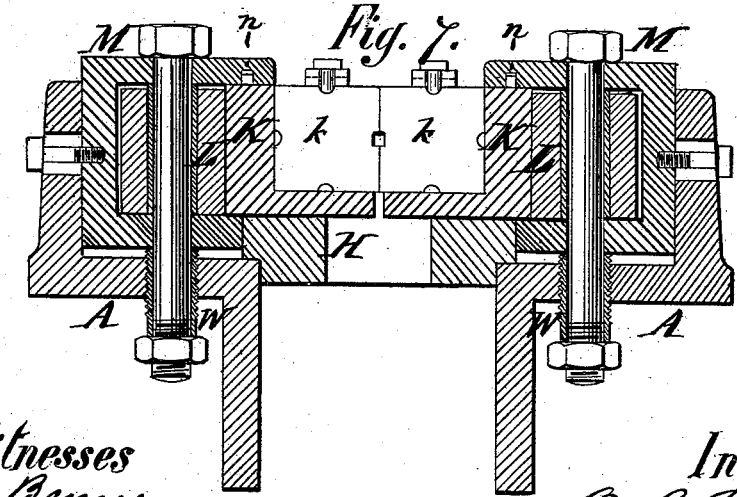
Witnesses
W. L. Bennem
W. H. Isaacs
Inventor:
O. C. Burdict
by his Atty.
E. S. Renwick

UNITED STATES PATENT OFFICE.

ORRIN C. BURDICT, OF BUFFALO, NEW YORK.

IMPROVEMENT IN MACHINES FOR FORGING WRENCH-BAR HEADS.

Specification forming part of Letters Patent No. 168,135, dated September 28, 1875; application filed July 6, 1875.

*To all whom it may concern:*

Be it known that I, ORRIN CLARK BURDICT, of Buffalo, in the county of Erie and State of New York, have made an invention of certain new and useful Improvements in Machines for Forging Wrench-Bars and other headed articles; and that the following is a full, clear, and exact description and specification of the same.

The object of my invention is primarily to enable headed wrench-bars to be forged with accuracy and speed, but parts of the invention are applicable to other purposes.

The invention consists of certain combinations of mechanical devices, by means of which the blank of which the headed article is to be formed is automatically griped and presented to a set of reciprocating forging-tools, consisting of a heading-tool and of a series of lateral tools arranged in pairs, which operate in succession upon the blank, so as to upset the end of the blank and forge it into a head of the desired form, after which the headed article is withdrawn, the whole operating in such manner that the forging-tools may be operated continuously without the necessity of stopping their movement when the blank is presented to or withdrawn from them.

The invention consists, further, of certain combinations, by means of which parts of the machine may be readily adjusted.

In order that the invention may be fully understood I have represented in the accompanying drawing, and will proceed to describe, a wrench-bar-forging machine embodying my invention in the best form at present known to me.

Figure 1:
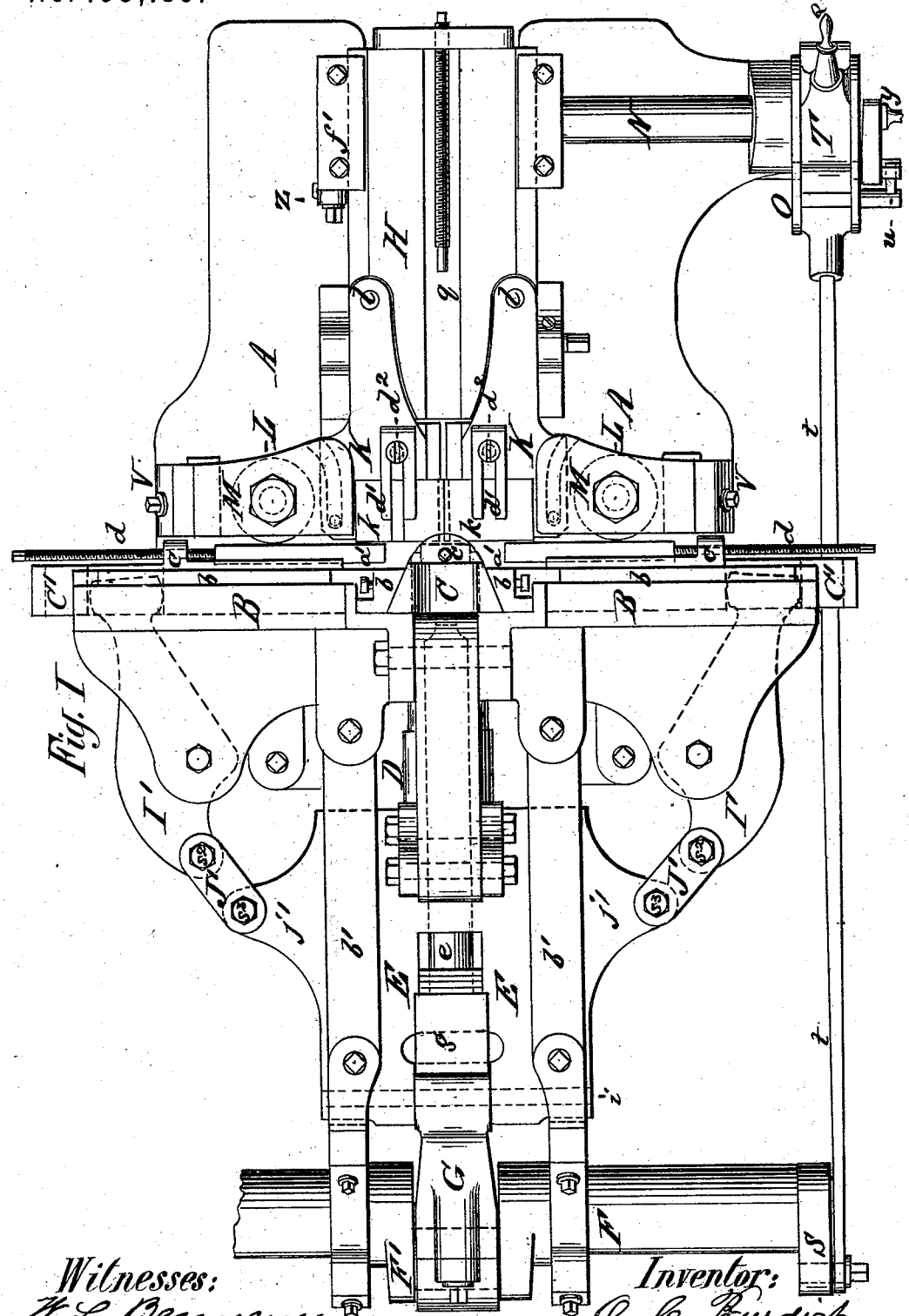
Figure 2:
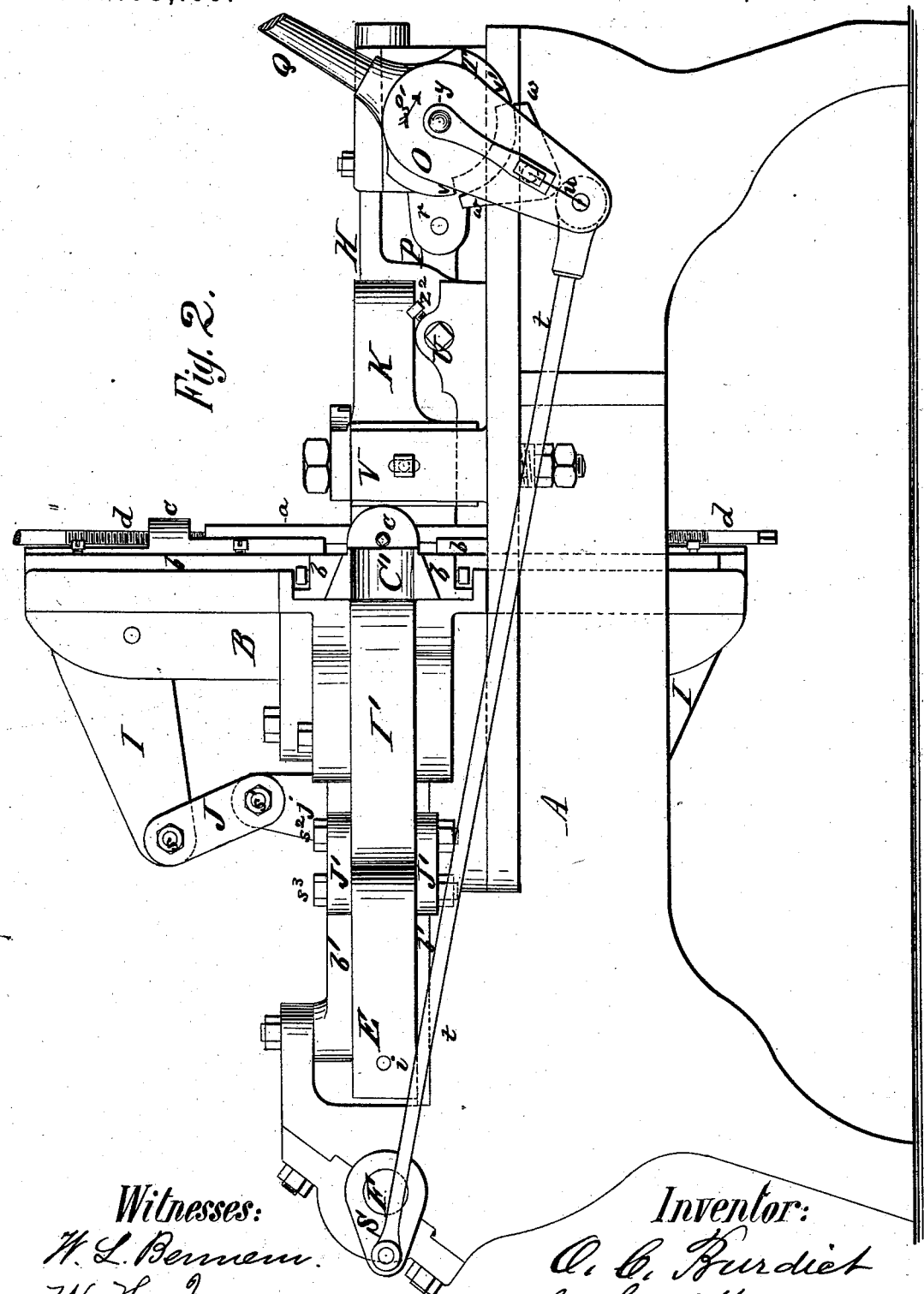
Figure 3:
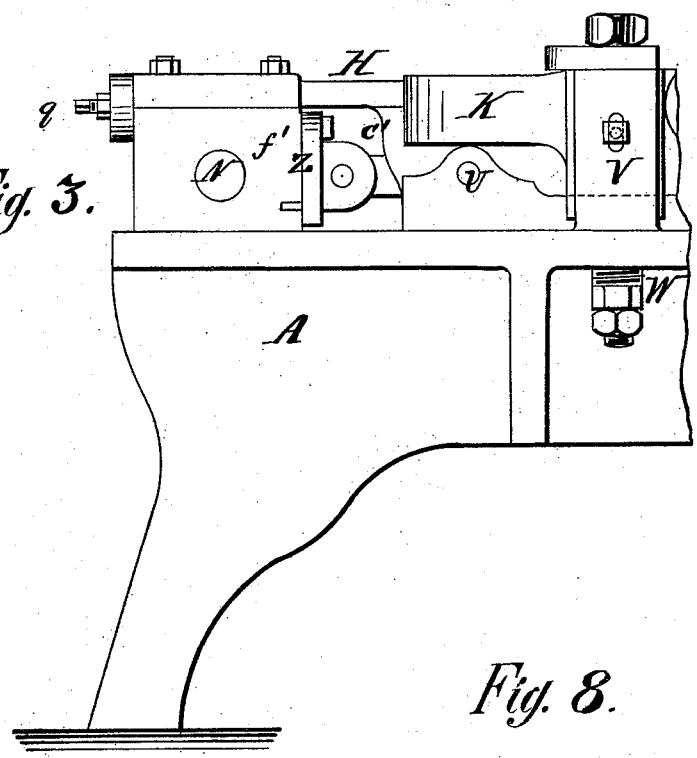

Figure 1 of said drawings represents a plan of the machine with the blank-carriage withdrawn. Fig. 2 represents a view of one of the sides of the machine. Fig. 3 represents a view of part of the other side thereof. Fig. 4 represents a vertical longitudinal section of the machine. Fig. 6 represents a transverse section of the machine in advance of the forging-tools. Figs. 5 and 7 to 9 inclusive represent views of detached parts of the machine designated by the same letters of reference as in the other figures. Figs. 10 and 11 represent a headed wrench-bar as forged by the machine; and Figs. 12 and 13 represent a wrench-bar blank which has been forged in a machine, ready for conversion into a headed wrench bar.

The various moving parts of the machine are connected with a strong main frame, A. Near the center of this frame there is a transverse frame, B, having the form of a cross, which sustains the slides C C C' C' of the lateral forging-tools $a$ $a$ $a'$ $a'$. These tools are four in number, so as to operate upon the four sides of the head. Each is connected with a separate slide arranged to move radially toward and from the center of the cross-frame. Each slide is fitted to move in guides $b$, which are adjustable, so that they may be set up to compensate wear. Each tool is held in place endwise by means of an adjusting-screw, $d$, which operates upon the butt of its shank, and is screwed through a lug, $c$, projecting from the slide, so that by turning said butt-screw more or less the acting face of the tool may be adjusted to its precise position, and may be set up when reduced by wear.

The upsetting or heading tool $e$ is fitted to a piston, D, which protrudes from a cross-head, E, that is constructed to slide to and fro between guides $b'$, secured to the bed-plate. The shank of the heading-tool passes through the piston into a cavity in the cross-head E, and is sustained by the cross-piece $f$ of said cross-head. The position of the face of the heading-tool may be adjusted by inserting packing (of sheet-iron) between the butt of the heading-tool and the cross-piece $f$. The cross-head is caused to reciprocate, for the purpose of operating the heading-tool, by means of a revolving crank-shaft, F, with which the slide is connected by means of a toggle-rod, G, whose outer end is formed into a box which fits the crank-wrist, while its butt abuts against a box, $g$, which bears against the cross-piece of the cross-head. As this box is movable relatively to the cross-head, sheet-metal packing may be inserted between the two to compensate for wear. The toggle-bar is connected also with the cross-head by means of a pivot, $i$, so that the cross-head may be drawn toward the crank-shaft as the latter revolves. In order that the lateral forging-dies may be operated by the same crank, their slides are connected with the cross-head E of the heading-tool. The slides C C of the upper and the lower lateral forging-tools $a$ $a$ are connected with the said cross-head by means of levers I I, toggle-links J J, and pivots $s$ $s^1$, the last ($s^1$) of which connects the toggle-link with an arm, $j$, of the cross-head. The levers I I are pivoted to the cross-frame B, and their heads work in sockets formed in their respective slides. Each slide C' of the horizontal lateral forging-dies $a'$ $a'$ is connected with the cross-head E by means of a lever, I', toggle-link J', and two pivots, $s^2$ $s^3$, the last ($s^3$) of which connects the toggle-link with an arm, $j'$, of the cross-head. The horizontal arms $j'$ $j'$ of the cross-head are so set that they are opposite the ends of the tool-levers I' I' when the cross-head is at the center of its stroke; hence the horizontal tools are forced toward each other at this time, and are withdrawn as the cross-head passes from its central position toward each end of its stroke, and, consequently, the horizontal lateral tools are caused to operate twice for each revolution of the crank-shaft. The arms $j$ of the upper and lower tools $a$ $a$ are set so that their toggle-links J J are most nearly at right angles with the direction of movement of the cross-head when the latter is at the outer end of its stroke; hence these tools each make one movement for each revolution of the crank-shaft. As the heading-tool is advanced by the inward movement of the cross-head, it follows the upper and lower lateral tools $a$ $a$ alternate in their action with the heading-tool, and that the horizontal forging-tools $a'$ operate between the movements of the header and the movements of the upper and lower tools $a$ $a$.

The profile of the heading-tool $e$, as represented at Fig. 9, is partly at right angles or square with its length, and partly oblique thereto. This form of tool is termed by me a square-oblique heading-tool, its profile being the counterpart of the profile of the head $x$ of the finished wrench-bar X. The forms of upper and lower tools $a$ $a$ are represented at Figs. 1, 5, and 6, and the forms of the horizontal tools $a'$ are represented at Figs. 5 and 6, the faces of the horizontal forging-tools $a'$ $a'$ being long and square with their shanks, to forge the long flat sides of the wrench-bar head, and the faces of the upper and lower tools $a$ $a$ being narrow and square with their shanks, to forge the ends of the wrench-bar head. By the operation of the crank-shaft F and cross-head E, these tools are caused to forge the head into the required form.

Figure 8:
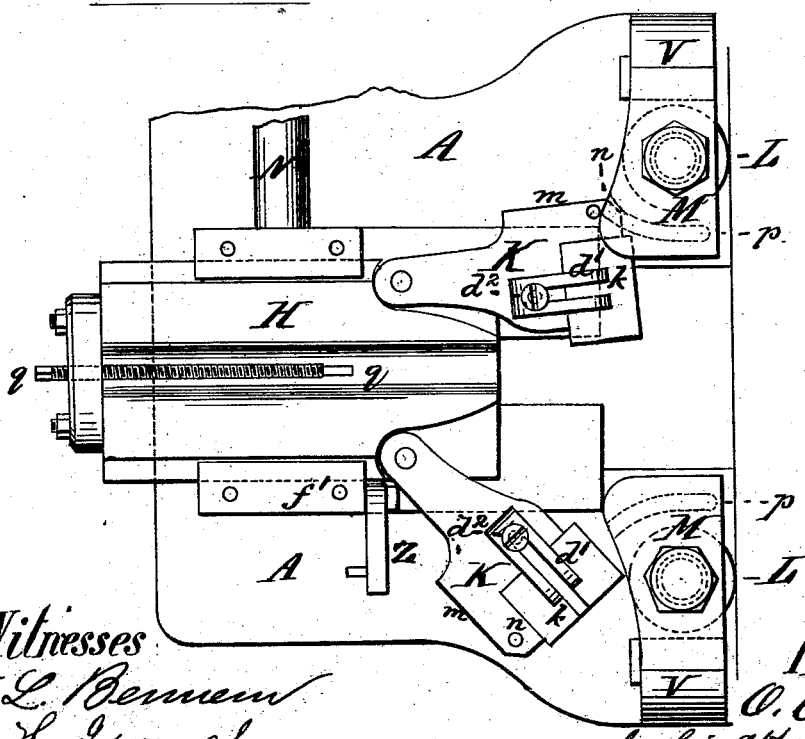

In order that the blank may be readily presented to, and withdrawn from, the forging-tools, the blank-carriage H is provided. This carriage is fitted to move on ways longitudinally of the machine, so that its forward end may be advanced toward the central space between the faces of the lateral forging-tools $a$ $a'$ and the heading-tool $e$. In order that the blank may be firmly held to the carriage, the latter is provided with a pair of movable jaws, K K, which are fitted to vibrate upon pivots $l$ $l$, and are constructed with recesses to hold movable griping-dies $k$ $k$. In order that the griping-jaws may grasp the neck of the blank when they are advanced toward the forging-dies, the front end of each jaw is inclined, as seen at Fig. 8, and a roller-guide, L, is provided, against which the inclined end of the jaw is forced when the carriage is advanced. As the two roller-guides L L are closer together than the outer sides of the jaws when they are open, the advance of the inclined ends of the jaws between the roller-guides forces the jaws toward each other, and causes the griping-dies to grasp the blank firmly. The continued advance of the griping-jaws with the carriage brings the parallel outer portions $m$ $m$ of the jaws between the roller-guides, so that the jaws are prevented from separating while the blank is moved forward and presented to the dies and heading-tool.

In order that the griping-dies may loose their hold upon the blank when the carriage is drawn back, each griping-jaw K is fitted with a pin, $n$, which projects from its upper side into a cam-groove, $p$, formed in the under side of the upper jaw of the stock M of the adjacent roller-guide L, so that when the carriage is drawn back the cam-groove, acting on the jaw-pin $n$, pulls the griping-jaw open and releases the blank.

The position of the blank in the carriage is determined by a movable abutment consisting of a screw, $q$, against the inner end of which the butt of the shank of the article is placed when it is applied to the carriage. The screw may be turned to adjust its inner end to articles having shanks of different lengths.

In order that the blank-carriage may be advanced and drawn back, it is connected with the arms $r$ $r$ of a rock-shaft, N, by means of a toggle-link, P, one end of which is pivoted to said arms, and the other end to the blank-carriage. The connection of the toggle-link with the carriage is so adjusted that the axis of the pivot of the arms of the rock-shaft is raised slightly above the horizontal plane, passing through the axis of the rock-shaft and the carriage-toggle pivot R, when the head of the blank is in the position for forging, and, as in this position of the parts, the ends of arms of the rock-shaft come in contact with the carriage, the latter is then locked in its advanced position, and remains there until the rock-shaft N is turned back again, the effect of which is to withdraw the carriage. The rock-shaft is fitted with a lever-handle, Q, which enables the carriage to be operated by hand; but the machine also contains mechanism for effecting the movement of the rock-shaft N, and consequently of the blank-carriage, by power. To this end a vibrating frame, O, is hung upon the rock-shaft N, and is connected by a rod, $t$, with a crank, S, secured to the driving-shaft F, so that the revolution of the latter causes the frame O to vibrate upon the rock-shaft. The frame O is fitted with a double headed pawl, $w$, turning upon a pivot in the frame, and fitted to engage with either of two teeth, $v\ v'$, formed upon the hub T, secured to the rock-shaft. When the pawl is turned so as to engage with the tooth $v$, the movement of the pawl, by the action of the crank S, turns the rock-shaft so as to advance the carriage, and when the pawl is turned so as to engage with the tooth $v'$, the movement of the pawl turns the rock-shaft N backward, so as to withdraw the carriage. The pawl is held in a mean position, without engagement with either tooth, by means of a spring, $u$, and a handle $y$, is provided to turn the pawl in both directions, so that the carriage may be either advanced or withdrawn, as required by the operator, and when in either position may be left there by letting go the handle, which permits the pawl-spring to restore the pawl to its mean inactive position. The crank S, which thus operates the carriage, is set or arranged at the same side of the driving-shaft as the crank F' which operates the heading-tool, and as the toggle-link P is moved upward to advance the carriage, it follows that the advance of the blank by the carriage takes place when the heading-tool is drawn back, so that it does not resist the advance of the blank.

It is important that the mechanism for moving the carriage should be capable of ready adjustment, so that the blank may be moved to its precise position. This adjustment is obtained (see Fig. 14) by constructing the wrist $z$ of the pivot U (which connects the toggle-link P with the carriage) eccentric to its ends $z^1\ z^1$, which turn in holes in the carriage. Hence, by turning this pivot on its axis the position of its eccentric wrist $z$ relatively to the carriage is varied, and, consequently the position to which the carriage is advanced by the operation of the rock-shaft N is varied. The eccentric pivot U is secured in any position to which it may be adjusted by means of a set-screw, $z^2$, Fig. 2.

In order that the griping-jaws K K may be adjusted to a higher or lower position, the stocks M of the roller-guides L L are constructed to move up and down upon the standards V of the frame, against which they rest; and they are supported upon tubular adjusting-screws W, which may be turned to raise or lower them. The lower sides of the griping-jaws K slide upon the ends of the lower jaws of the guide-stocks M, so that the upward or downward movement of the latter raises or lowers the jaws. The gripe of the jaws upon the article may be adjusted by inserting sheet-metal packing between the griping-dies $k\ k$ and the adjacent faces of the recesses of the griping-jaws. The griping-dies $k$ are squared blocks of steel, having four faces, each of which is formed with a griping-groove, so that the dies may be turned, and their several faces may be used in succession. Each griping-die is secured to its respective griping-jaw by means of a clamp, $d^1$, and clamp-screw $d^2$; and in order that the griping-dies may be readily removed and replaced, the carriage is constructed with a sufficient amount of longitudinal movement on the main frame to permit it to be withdrawn far enough for the griping-dies to clear the roller-guide stocks M. As the withdrawal to this position when the machine was at work might disengage the griping-jaws from the roller-guides, and the jaw-pins $n$ from the cam-grooves, a movable dog, Z, is provided to limit the withdrawal movement of the carriage. This dog is pivoted to one of the pillow-blocks, $f^1$, of the rock-shaft N, and intervenes between that pillow-block and a shoulder, $c^1$, on the carriage. When the griping-dies are to be removed or adjusted, this dog is turned on its pivot, so as to permit the carriage to be drawn back far enough to free the griping-jaws and permit them to be swung out.

When the machine is to be used the driving-crank shaft F (which should be fitted with fast and loose pulleys, and with a fly-wheel) is caused to revolve continuously by means of a belt. The blank previously heated is dropped into the carriage, with the end of its shank against the butt-screw $q$. The movement of the pawl-handle $y$ in the direction indicated by the arrow $g'$ causes the carriage to be advanced by the operation of the crank S. The first portion of this advance impels the inclined ends of the griping-jaws between the roller-guides, and effects the griping of the blank. The further advance carries the end of the blank into the central space between the heading-tool and the lateral forging-dies, thus presenting the blank for their action. When the forging is completed the pawl-handle $y$ is moved in the reverse direction, whereupon the action of the crank S effects the withdrawal of the carriage; and as the carriage is withdrawn, the sides of the cam-grooves $p\ p$, acting upon the pins $n\ n$, insure the opening of the griping-jaws and the release of the forged article, which may then be removed by means of a pair of tongs. In forging wrench-bar heads the blank, cut from a straight rectangular bar, is first forged to the form represented at Figs. 12 and 13, by means of a flat-faced heading-tool and suitable lateral dies. Then the headed blank is reheated, and is subjected to the action of the lateral dies $a\ a\ a'\ a'$ and square oblique-faced heading-tool $e$. The preliminary heading of the blank may be effected in the same machine as the last forging, (by changing the lateral tools and heading-tool,) or in a separate machine. The machine may be used to forge other headed articles than wrench-bars, using lateral forging-tools and a heading-tool of the required forms for the purpose.

I claim as my invention—

1. The combination, substantially as before set forth, of the cross-head for operating the forging-tools, the revolving crank-shaft, the toggle-bar, the movable box for its butt, and the toggle-pivot.

2. The blank-carriage, constructed substantially as before set forth, with movable griping-jaws, and an abutment for the butt of the blank.

3. The combination, substantially as before set forth, of the lateral forging-tools and the blank-carriage, fitted with movable griping-jaws for griping and presenting the blank to said lateral tools and withdrawing it therefrom.

4. The combination, substantially as before set forth, of the blank-carriage, fitted with movable griping-jaws, and the heading-tool, toward which the blank is advanced in a grasped condition.

5. The combination, substantially as before set forth, of the blank-carriage, fitted with movable griping-jaws, and the guides between which the jaws are impelled, and which cause them to gripe the blank.

6. The combination, substantially as before set forth, of the blank-carriage, fitted with movable griping-jaws, the jaw-pins, and the cam-grooves for opening said jaws when the carriage is drawn back.

7. The combination, substantially as before set forth, of the blank-carriage, fitted with movable griping-jaws, the guide, stocks, and the adjusting-screws for adjusting the guide-stocks.

8. The combination, substantially as before set forth, of the blank-carriage, the rock-shaft, the toggle-link, and the eccentric-wristed toggle-pivot.

9. The combination, substantially as before set forth, of blank-carriage, the rock-shaft, the vibrating pawl, and the driving-shaft.

10. The combination, substantially as before set forth, of the blank-carriage, fitted with movable griping-jaws, the rock-shaft for moving the carriage, and the movable dog for limiting the withdrawal movement.

Witness my hand this 17th day of June, A. D. 1875.

ORRIN CLARK BURDICT.

Witnesses:
P. P. BURTIS,
S. FINLEY.